United States Patent
Qiu

(10) Patent No.: US 12,526,211 B2
(45) Date of Patent: Jan. 13, 2026

(54) MESSAGE PROCESSING METHOD FOR IN-SITU FLOW DETECTION, AND NETWORK DEVICE

(71) Applicant: New H3C Technologies Co., Ltd., Hangzhou (CN)

(72) Inventor: Yuanxiang Qiu, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 19 days.

(21) Appl. No.: 18/714,636

(22) PCT Filed: Jun. 14, 2022

(86) PCT No.: PCT/CN2022/098631
§ 371 (c)(1),
(2) Date: May 30, 2024

(87) PCT Pub. No.: WO2023/240438
PCT Pub. Date: Dec. 21, 2023

(65) Prior Publication Data
US 2025/0039066 A1    Jan. 30, 2025

(51) Int. Cl.
*H04L 43/026* (2022.01)
*H04L 45/00* (2022.01)

(52) U.S. Cl.
CPC ............ *H04L 43/026* (2013.01); *H04L 45/22* (2013.01)

(58) Field of Classification Search
None
See application file for complete search history.

(56) References Cited

U.S. PATENT DOCUMENTS 11,762,725 B2 * 9/2023 Fusco .................... G06F 9/542
714/48
2011/0113105 A1  5/2011 Eckardt
(Continued)

FOREIGN PATENT DOCUMENTS

CN          111953553      11/2020
CN          113765732      12/2021
(Continued)

OTHER PUBLICATIONS

Extended European Search Report issued in corresponding European Application No. dated Jan. 27, 2025.
(Continued)

*Primary Examiner* — Jason D Cardone
(74) *Attorney, Agent, or Firm* — NORTON ROSE FULBRIGHT US LLP

(57) ABSTRACT

A message processing method for in-situ flow detection and network device relate to the field of communication technology. The method includes: receiving a first service message; sending a second service message to a second network device, wherein the second service message includes a first in-situ flow detection option and the first service message, wherein the first in-situ flow detection option includes first additional information, the first additional information includes first reverse service flow characteristics, and the first reverse service flow characteristics are used by a head node of a first reverse path for generating a first service flow identification rule for in-situ flow detection; wherein, the head node is a tail node of a first forward path, and the first network device and the second network device are both on the first forward path and the first reverse path. The configuration workload can be reduced.

22 Claims, 3 Drawing Sheets

| Type=1 Type | Len Length | Family Adress family | SIP Source IP adress | SIP Mask Source IP mask | DIP Destination IP address | DIP Mask Destination IP mask | Protocol Protocol number | Sport Source port | Dport Destination port | ...... |
|---|---|---|---|---|---|---|---|---|---|---|

←————Value (First reverse service flow characteristics)————→

(56) References Cited

U.S. PATENT DOCUMENTS

| | | | |
|---|---|---|---|
| 2018/0152369 A1* | 5/2018 | McCallen | H04L 43/0829 |
| 2022/0078106 A1 | 3/2022 | Xue et al. | |
| 2022/0247668 A1* | 8/2022 | Ji | H04L 47/15 |
| 2022/0294722 A1* | 9/2022 | Li | H04L 43/028 |
| 2023/0006906 A1* | 1/2023 | Shu | H04W 24/08 |
| 2023/0045227 A1* | 2/2023 | Chu | H04L 43/026 |
| 2023/0102193 A1* | 3/2023 | Zhou | H04L 41/34 370/241.1 |
| 2023/0155928 A1* | 5/2023 | Ben | H04L 43/0876 709/238 |
| 2023/0231804 A1* | 7/2023 | Qiu | H04L 45/04 709/238 |
| 2023/0261962 A1* | 8/2023 | Li | H04L 45/16 370/252 |
| 2024/0098004 A1* | 3/2024 | Peng | H04L 43/026 |

FOREIGN PATENT DOCUMENTS

| | | |
|---|---|---|
| CN | 114257494 | 3/2022 |
| CN | 114513429 | 5/2022 |
| EP | 4102785 | 12/2022 |
| EP | 4109959 | 12/2022 |
| EP | 4149058 | 3/2023 |
| WO | WO 2015/081542 | 6/2015 |
| WO | WO 2020/228398 | 11/2020 |
| WO | WO 2021/170092 | 9/2021 |
| WO | WO 2021/179994 | 9/2021 |
| WO | WO 2021/244439 | 12/2021 |
| WO | WO 2022/115114 | 6/2022 |

OTHER PUBLICATIONS

International Search Report and Written Opinion issued in Corresponding PCT Application No. PCT /CN2022/098631, dated Mar. 9, 2023 (English Translation provided).

Office Action issued in corresponding Japanese Application No. 2024-535967, dated Jul. 29, 2025 (English Translation provided).

* cited by examiner

MESSAGE PROCESSING METHOD FOR IN-SITU FLOW DETECTION, AND NETWORK DEVICE

CROSS REFERENCE TO RELATED APPLICATION

The present application is a national phase application under 35 U.S.C. § 371 of International Application No. PCT/CN2022/098631, filed Jun. 14, 2022, the entire contents of which are incorporated herein by reference in their entirety.

TECHNICAL FIELD

The present disclosure relates to the field of communication technology, and in particular to message processing.

BACKGROUND

In-situ Operation Administration and Maintenance (IOAM) is an in-situ flow detection technology, which means that by inserting control information into a message of specified service flow, the forwarding device identifies the control information carried by the message, and then reports the information collected for the message to an analyzer, so that the analyzer can identify subtle anomalies in the network and accurately detect performance information such as delay and message loss of each service to realize real-time monitoring of network quality, rapid network fault location and forwarding path optimization.

In the current transmission network, backup links are usually deployed. In order to detect forward flow and backhaul flow, it is necessary to configure the characteristics of the service flow to be detected on the head node and the tail node of each backup link.

Taking Segment Routing over IPv6 (SRv6) networking as an example, as shown in FIG. 1, devices A, C, D, E, F, G, and H are all located in the bearer network. Device A is the head node (Ingress). There are two forwarding paths between device A and device B, wherein the primary path is devices A-C-E-G, and the backup path is devices A-D-F-H, wherein device G is the tail node of the primary path, and device H is the tail node of the backup path. If it is necessary to measure the transmission quality of the service flow from device I to device B in the bearer network, the characteristics of the service flow need to be configured in device A. If it is necessary to measure the transmission quality of the reverse flow of the service flow in the bearer network, because the actual path of the service flow may be dynamically switched due to the influence of the network quality, it is necessary to configure the characteristics of the reverse flow in the head node of each reverse path, that is, device G and device H. In the case of many backup paths, the number of devices to be configured will also be large, resulting in a large configuration workload.

SUMMARY

The purpose of the examples of the present disclosure is to process messages, so as to reduce the configuration workload. Specifically, the technical solutions are as follows:

In a first aspect, an example of the present disclosure provides a message processing method, which is applied to a first network device, and the method includes:

receiving a first service message; sending a second service message to a second network device, wherein the second service message includes a first in-situ flow detection option and the first service message, wherein the first in-situ flow detection option includes first additional information, the first additional information includes first reverse service flow characteristics, and the first reverse service flow characteristics are used by a head node of a first reverse path for generating a first service flow identification rule for in-situ flow detection; wherein, the head node is a tail node of the first forward path, and the first network device and the second network device are both on the first forward path and the first reverse path.

In a possible implementation, the first in-situ flow detection option further includes first indication information, wherein the first indication information is used to indicate whether the first in-situ flow detection option includes first additional information; when the first indication information has a value of a first value, the first in-situ flow detection option includes the first additional information; when the first indication information has a value of a second value, the first in-situ flow detection option does not include the first additional information.

In a possible implementation, the first in-situ flow detection option also includes second indication information, the second indication information is used to indicate whether the head node generates the first service flow identification rule; when the second indication information has a value of the first value, it indicates that the head node generates the first service flow identification rule; when the second indication information has a value of the second value, it indicates that the head node does not generate the first service flow identification rule.

In a possible implementation, after the receiving the first service message, the method further includes: matching the first service message with first forward flow characteristics and second forward flow characteristics, the first forward flow characteristics are characteristics of the forward service flow for in-situ flow detection, and the second forward flow characteristics are characteristics of the forward service flow corresponding to the reverse service flow for in-situ flow detection; encapsulating, if the first service message matches the first forward flow characteristics and the second forward flow characteristics, the first service message with the first in-situ flow detection option in the outer layer of the first service message to obtain the second service message.

In a possible implementation, after matching the first service message with the first forward flow characteristics and the second forward flow characteristics, the method further includes: encapsulating, if the first service message matches the first forward flow characteristics and does not match the second forward flow characteristics, the first service message with a second in-situ flow detection option in the outer layer of the first service message to obtain a third service message, and sending the third service message to the second network device; the second in-situ flow detection option includes first indication information and second indication information whose values are both second values; or, encapsulating, if the first service message matches both the first forward flow characteristics and the second forward flow characteristics and the first network device is not configured with the first reverse service flow characteristics, the first service message with a third in-situ flow detection option to obtain a fourth service message, and sending the fourth service message to the second network device; the third in-situ flow detection option includes the first indication information whose value is the second value and the second indication information whose value is a first value.

In a possible implementation, the first reverse service flow characteristics include an IP address and a mask for representing an IP subnet, which are used to indicate the head node to perform in-situ flow detection on the reverse service belonging to the IP subnet.

In a possible implementation, the first in-situ flow detection option, the second in-situ flow detection option, and the third in-situ flow detection option all include an extended flow detection type field, a service flow direction identification field, and a reserved field, one bit in the extended flow detection type field carries the first indication information, and the service flow direction identification field carries the second indication information.

In a possible implementation, the reserved field of the first in-situ flow detection option carries the first additional information.

In a possible implementation, the reserved field of the first in-situ flow detection option includes a TLV structure, a value field of the TLV structure carries the first additional information.

In a possible implementation, the method further includes: receiving a fifth service message sent by a third network device, the fifth service message includes a fourth in-situ flow detection option, and the fourth in-situ flow detection option includes second additional information, the second additional information includes the second reverse service flow characteristics, the first network device and the third network device are both on the second forward path and the second reverse path, the first network device is the head node of the second reverse path; and generating a second service flow identification rule for in-situ flow detection based on the second reverse service flow characteristics.

In a possible implementation, after generating the second service flow identification rule for in-situ flow detection based on the second reverse service flow characteristics, the method further includes: storing the second service flow identification rule to a forwarding plane; encapsulating, when receiving a sixth service message that conforms to the second service flow identification rule, the sixth service message with a fifth in-situ flow detection option, and sending the sixth service message encapsulated with the fifth in-situ flow detection option to the third network device, the fifth in-situ flow detection option includes first indication information and second indication information whose values are both second values.

In a possible implementation, after storing the second service flow identification rule to the forwarding plane, the method further includes:
  deleting, if no service message matching the second service flow identification rule is received within a specified time period, the second service flow identification rule from the forwarding plane.

In a second aspect, an example of the present disclosure provides a message processing apparatus, which is applied to a first network device, and the apparatus includes:
  a receiving module, to receive a first service message; a sending module, to send a second service message to a second network device, wherein the second service message includes a first in-situ flow detection option and the first service message, wherein the first in-situ flow detection option includes first additional information, the first additional information includes first reverse service flow characteristics, and the first reverse service flow characteristics are used by a head node of a first reverse path for generating a first service flow identification rule for in-situ flow detection; wherein, the head node is a tail node of a first forward path, and the first network device and the second network device are both on the first forward path and the first reverse path.

In a possible implementation, the first in-situ flow detection option further includes first indication information, wherein the first indication information is used to indicate whether the first in-situ flow detection option includes first additional information; when the first indication information has a value of a first value, the first in-situ flow detection option includes the first additional information; when the first indication information has a value of a second value, the first in-situ flow detection option does not include the first additional information.

In a possible implementation, the first in-situ flow detection option also includes second indication information, the second indication information is used to indicate whether the head node generates the first service flow identification rule; when the second indication information has a value of the first value, it indicates that the head node generates the first service flow identification rule; when the second indication information has a value of the second value, it indicates that the head node does not generate the first service flow identification rule.

In a possible implementation, the apparatus further includes: a matching module, to match the first service message with first forward flow characteristics and second forward flow characteristics, the first forward flow characteristics are the characteristics of the forward service flow for in-situ flow detection, and the second forward flow characteristics are characteristics of the forward service flow corresponding to the reverse service flow for in-situ flow detection; an encapsulating module, to encapsulate, if the first service message matches both the first forward flow characteristics and the second forward flow characteristics, the first service message with the first in-situ flow detection option in an outer layer of the first service message to obtain the second service message.

In a possible implementation, the encapsulating module is also to encapsulate, if the first service message matches the first forward flow characteristics and does not match the second forward flow characteristics, the first service message with a second in-situ flow detection option in the outer layer of the first service message to obtain a third service message, and send the third service message to the second network device; the second in-situ flow detection option includes first indication information and second indication information whose values are both second values; or,
  encapsulate, if the first service message matches both the first forward flow characteristics and the second forward flow characteristics and the first network device is not configured with the first reverse service flow characteristics, the first service message with a third in-situ flow detection option to obtain a fourth service message, and send the fourth service message to the second network device; the third in-situ flow detection option includes the first indication information whose value is the second value and the second indication information whose value is a first value.

In a possible implementation, the first reverse service flow characteristics include an IP address and a mask for representing an IP subnet, which are used to indicate the head node to perform in-situ flow detection on the reverse service belonging to the IP subnet.

In a possible implementation, the first in-situ flow detection option, the second in-situ flow detection option, and the third in-situ flow detection option all include an extended flow detection type field, a service flow direction identification field, and a reserved field, one bit in the extended flow detection type field carries the first indication information, and the service flow direction identification field carries the second indication information.

In a possible implementation, the reserved field of the first in-situ flow detection option carries the first additional information. In a possible implementation, the reserved field of the first in-situ flow detection option includes a TLV structure, a value field of the TLV structure carries the first additional information.

In a possible implementation, the apparatus further includes: a generating module, the receiving module is also to receive a fifth service message sent by a third network device, the fifth service message includes a fourth in-situ flow detection option, and the fourth in-situ flow detection option includes second additional information, the second additional information includes the second reverse service flow characteristics, the first network device and the third network device are both on the second forward path and the second reverse path, the first network device is the head node of the second reverse path; and the generating module is to generate a second service flow identification rule for in-situ flow detection based on the second reverse service flow characteristics.

In a possible implementation, the apparatus further includes: a storing module, to store the second service flow identification rule to a forwarding plane; the encapsulating module is also to encapsulate, when receiving a sixth service message that conforms to the second service flow identification rule, the sixth service message with a fifth in-situ flow detection option, and send a sixth service message encapsulated the fifth in-situ flow detection option to the third network device, the fifth in-situ flow detection option includes first indication information and second indication information whose values are both second values.

In a possible implementation, the apparatus further includes: a deletion module, to delete, if no service message matching the second service flow identification rule is received within a specified time period, the second service flow identification rule from the forwarding plane.

In a third aspect, an example of the present disclosure provides a network device, which includes:

a processor; a transceiver; a machine-readable storage medium storing machine executable instructions that can be executed by the processor; the machine executable instructions cause the processor to perform the following operations: receiving a first service message through the transceiver; sending a second service message to the second network device through the transceiver, the second service message includes a first in-situ flow detection option and the first service message, the first in-situ flow detection option includes first additional information, the first additional information includes first reverse service flow characteristics, which are used by a head node of a first reverse path for generating the first service flow identification rule for in-situ flow detection; wherein, the head node is the tail node of the first forward path, and the first network device and the second network device are both on the first forward path and the first reverse path.

In a possible implementation, the first in-situ flow detection option further includes first indication information, wherein the first indication information is used to indicate whether the first in-situ flow detection option includes first additional information; when the first indication information has a value of a first value, the first in-situ flow detection option includes the first additional information; when the first indication information has a value of a second value, the first in-situ flow detection option does not include the first additional information.

In a possible implementation, the first in-situ flow detection option also includes second indication information, which is used to indicate whether the head node generates the first service flow identification rule; when the second indication information has a value of the first value, it indicates that the head node generates the first service flow identification rule; when the second indication information has a value of the second value, it indicates that the head node does not generate the first service flow identification rule.

In a possible implementation, the machine executable instructions further cause the processor to perform the following operations: matching the first service message with the first forward flow characteristics and second forward flow characteristics, the first forward flow characteristics are characteristics of the forward service flow for in-situ flow detection, and the second forward flow characteristics are characteristics of the forward service flow corresponding to the reverse service flow for in-situ flow detection; encapsulating, if the first service message matches the first forward flow characteristics and the second forward flow characteristics, the first service message with the first in-situ flow detection option in the outer layer of the first service message to obtain the second service message.

In a possible implementation, the machine executable instructions further cause the processor to perform the following operations: encapsulating, if the first service message matches the first forward flow characteristics and does not match the second forward flow characteristics, the first service message with a second in-situ flow detection option in the outer layer of the first service message to obtain a third service message, and sending the third service message to the second network device; the second in-situ flow detection option includes first indication information and second indication information whose values are both second values; or, encapsulating, if the first service message matches both the first forward flow characteristics and the second forward flow characteristics and the first network device is not configured with the first reverse service flow characteristics, the first service message with a third in-situ flow detection option to obtain a fourth service message, and sending the fourth service message to the second network device through the transceiver; the third in-situ flow detection option includes the first indication information whose value is the second value and the second indication information whose value is a first value.

In a possible implementation, the first reverse service flow characteristics include an IP address and a mask for representing an IP subnet, which are used to indicate the head node to perform in-situ flow detection on the reverse service belonging to the IP subnet.

In a possible implementation, the first in-situ flow detection option, the second in-situ flow detection option, and the third in-situ flow detection option all include an extended flow detection type field, a service flow direction identification field, and a reserved field, one bit in the extended flow detection type field carries the first indication information, and the service flow direction identification field carries the second indication information.

In a possible implementation, the reserved field of the first in-situ flow detection option carries the first additional information.

In a possible implementation, the reserved field of the first in-situ flow detection option includes a TLV structure, a value field of the TLV structure carries the first additional information.

In a possible implementation, the machine executable instructions further cause the processor to perform the following operations:

receiving a fifth service message sent by a third network device through the transceiver, the fifth service message includes a fourth in-situ flow detection option, and the fourth in-situ flow detection option includes second additional information, the second additional information includes the second reverse service flow characteristics, the first network device and the third network device are both on the second forward path and the second reverse path, the first network device is the head node of the second reverse path; and generating a second service flow identification rule for in-situ flow detection based on the second reverse service flow characteristics.

In a possible implementation, the machine executable instructions further cause the processor to perform the following operations:

storing the second service flow identification rule to the forwarding plane; encapsulating, when receiving a sixth service message that conforms to the second service flow identification rule, the sixth service message with a fifth in-situ flow detection option, and sending a sixth service message encapsulated with the fifth in-situ flow detection option to the third network device through the transceiver, the fifth in-situ flow detection option includes first indication information and second indication information which both take the values of the second value.

In a possible implementation, the machine executable instructions further cause the processor to perform the following operations:

deleting, if no service message matching the second service flow identification rule is received through the transceiver within a specified time period, the second service flow identification rule from the forwarding plane.

In a fourth aspect, an example of the present disclosure further provides a machine readable storage medium storing machine executable instructions that, when called and executed by a processor, cause the processor to implement blocks shown in the above message processing method.

In a fifth aspect, an example of the present disclosure further provides a computer program product including instructions that, when running on a computer, cause the computer to implement blocks in the above message processing method.

Using the above technical solution, the first network device can encapsulate the first service message with the first in-situ flow detection option, and forward the second service message including the first service message and the first in-situ flow detection option. Since the first in-situ flow detection option includes the first indication information and the first additional information, when the tail node receives the second service message, the first reverse service flow characteristics included in the first additional information can be acquired. In this way, the tail node of the used path can obtain the first reverse service flow characteristics. Since the service flow does not pass through other backup paths, it is not necessary to manually configure the first reverse service flow characteristics for other backup paths, which can reduce the configuration workload.

BRIEF DESCRIPTION OF THE DRAWINGS

In order to more clearly describe the technical solutions of the disclosure and those of the prior art, drawings used to illustrate the disclosure and the prior art will be briefly described below. It should be understood that the drawings below are illustrated by way of example only. Those of ordinary skill in the art can obtain further drawings based on these drawings without any creative efforts.

DETAILED DESCRIPTION

In order to make objectives, technical solutions and advantages of the present disclosure more apparent, the present disclosure now will be described in detail with reference to the accompanying drawings and the detailed description. Obviously, the examples described are only some of the examples of the present disclosure instead of all the examples. All further examples obtained by those of ordinary skills in the art based on the examples herein without any creative efforts are within the scope of the present disclosure.

For ease of understanding, the related concepts involved in the examples of the present disclosure are first introduced.

The in-situ flow detection technology in the example of the present disclosure is an in-situ flow detection technology based on IOAM, that is, the service message transmitted in the in-situ flow detection network carries in-situ flow detection data, and after each device in the in-situ flow detection network identifies the in-situ flow detection data included in the service message, measurement data can be reported to the analyzer based on the in-situ flow detection data.

Figure 2:
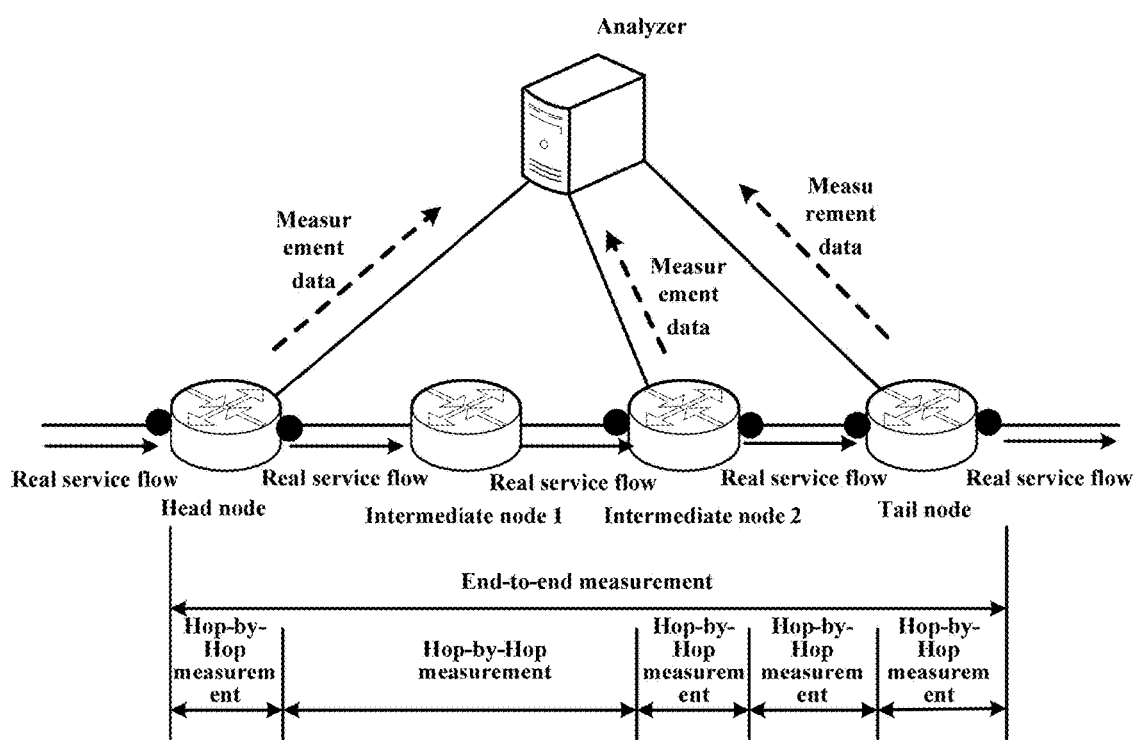
FIG. 2 is an exemplary schematic diagram of the structure of an in-situ flow detection network according to an example of the present disclosure.

As shown in FIG. 2, FIG. 2 is an exemplary schematic diagram of the structure of an in-situ flow detection network according to an example of the present disclosure; the in-situ flow detection network includes a head node, multiple intermediate nodes, and a tail node. FIG. 2 exemplarily shows two intermediate nodes, which are an intermediate node 1 and an intermediate node 2 respectively, wherein the intermediate node 1 does not support the in-situ flow detection, and the intermediate node 2 supports the in-situ flow detection.

The head node is to receive a real service flow. If it is determined that the in-situ flow detection is necessary for the service flow, it sends the measurement data of the service flow to the analyzer, adds the in-situ flow detection data into the service flow, and forwards the service flow carrying the in-situ flow detection data to the intermediate node 1 connected to itself. Because the intermediate node 1 does not support in-situ monitoring, it directly forwards the service flow to the intermediate node 2.

The intermediate node 2 is to receive the service flow. If it is identified that the service flow includes in-situ flow detection data, and the measurement type indicated by the in-situ flow detection data is Hop-by-Hop measurement, then it sends measurement data of the service flow to the analyzer based on the in-situ flow detection data, and forwards the service flow to the tail node. Alternatively, if the measurement type indicated by the in-situ flow detection data is end-to-end measurement, the service flow can be forwarded to the tail node without sending measurement data to the analyzer.

The tail node is to receive the service flow. If it is identified that the service flow includes in-situ flow detection data, it sends the measurement data of the service flow to the analyzer based on the in-situ flow detection data, and deletes the in-situ flow detection data in the service flow, and then forwards the service flow.

The analyzer is to receive the measurement data sent by the head node, the intermediate node and the tail node, and summarize and calculate the received measurement data. Both the analyzer and the device supporting in-situ flow detection run the clock synchronization protocol. In FIG. 2, the clocks between the analyzer, head node, intermediate node 2 and tail node are synchronized.

Figure 1:
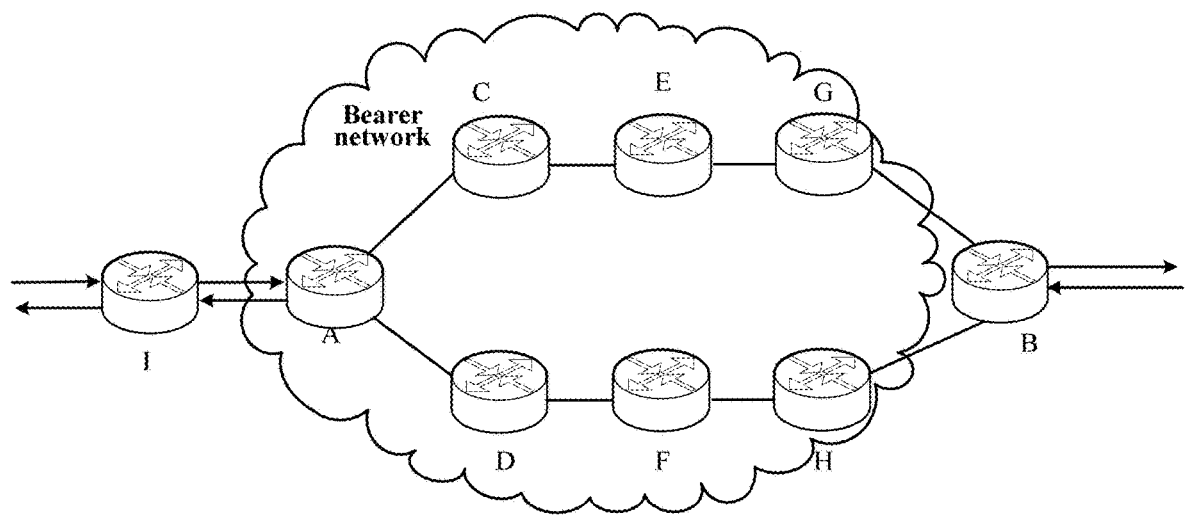
FIG. 1 is a schematic structural diagram of a SRv6 networking provided by the background technology.

FIG. 2 is an example of an in-situ flow detection network. During network deployment, in order to improve network reliability, a backup link can also be deployed, that is, the in-situ flow detection network can include devices A, C, D, E, F, G, and H where device A in FIG. 1 is the head node, device G and device H are tail nodes, devices A, G, and H are network-side edge (Provider Edge, PE) devices, and devices C, D, E, and F can be PE devices or P devices. P (Provider) devices refer to network-side core devices, and device I and device B are both user-side edge (Customer Edge, CE) devices. All these devices can send measurement data to the analyzer according to the in-situ flow detection data carried by the service flow.

It should be noted that both the devices involved in FIG. 1 and the nodes involved in FIG. 2 may be network devices such as switches or routers.

In the example of the present disclosure, the backup path in the in-situ flow detection network is not limited to one. For example, there may be a situation where multiple paths are mutually backup, so there are multiple tail nodes. If reverse flow characteristics that requires in-situ flow detection are used for multiple tail nodes respectively, it will require a large configuration workload.

In addition, the reverse flow characteristics need to be sent to a hardware data forwarding plane of the tail node, so that the hardware data forwarding plane of the tail node can perform in-situ flow detection on the reverse flow based on the reverse flow characteristics. In this way, the reverse flow characteristics will occupy the hardware resources of the tail node.

Since the reverse flow will only pass through one of the backup paths, that is, the reverse flow will not pass through the other backup paths, so the reverse flow characteristics configured on the tail nodes of the other backup paths will not be used. Even if these reverse flow characteristics cannot be used, they cannot be deleted, which will occupy the hardware resources of the tail node. The more backup paths or the more reverse flow characteristics, the more hardware resources are wasted in the bearer network. When hardware resources are in short supply, other services that really need hardware resources cannot be deployed normally because they cannot apply for hardware resources.

In order to solve the above problem, an example of the present disclosure provides a message processing method, the method is applied to a first network device, and the method includes:

receiving a first service message, and sending a second service message to a second network device, where the second service message includes a first in-situ flow detection option and the first service message, and the first in-situ flow detection option includes first additional information, the first additional information includes first reverse service flow characteristics, and the first reverse service flow characteristics are used by a head node of a first reverse path for generating a first service flow identification rule for in-situ flow detection; wherein, the head node is a tail node of a first forward path, the first network device and the second network device are both on the first forward path and the first reverse path.

With this method, after receiving the first service message, the first network device can send a second service message to the second network device which includes a first in-situ flow detection option and the first service message. Since the first in-situ flow detection option includes first indication information and first additional information, so when the tail node of the first forward path receives the second service message, it can obtain the first reverse service flow characteristics included in the first additional information. In this way, the tail node of the currently used path can automatically obtain the first reverse service flow characteristics. Since the reverse service flow does not pass through other backup paths, there is no need to manually configure the first reverse service flow characteristics for other backup paths, which can reduce the configuration workload.

The message processing method provided by an example of the present disclosure is described in detail below.

Figure 3:
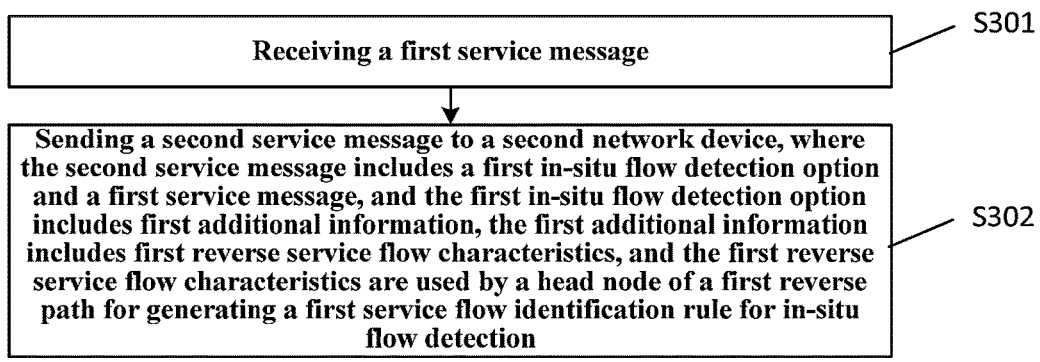
FIG. 3 is a flowchart of a message processing method according to an example of the present disclosure.

As shown in FIG. 3, the example of the present disclosure provides a message processing method, which is applied to a first network device, and the method includes the following blocks:

S301, receiving a first service message.

Wherein, the first service message is a service message sent by a device outside the in-situ flow detection network to the first network device. Taking the SRv6 network shown in FIG. 1 as an example, the first service message may be a service message sent by device I to device A.

S302, sending a second service message to a second network device, where the second service message includes a first in-situ flow detection option and a first service message, and the first in-situ flow detection option includes first additional information, the first additional information includes first reverse service flow characteristics, and the first reverse service flow characteristics are used by a head node of a first reverse path for generating a first service flow identification rule for in-situ flow detection.

Wherein, the head node is a tail node of a first forward path, and the first network device and the second network device are both on the first forward path and the first reverse path.

As an example, the first reverse path may be the path from device G to device A in FIG. 1, correspondingly, the first forward path is the path from device A to device G, and the head node of the first reverse path is device G, and at the same time, device G serves as the tail node of the first forward path.

Or the first reverse path may be the path from device H to device A in FIG. 1, correspondingly, the first forward path is the path from device A to device H, and the head node of the first reverse path is device H, and at the same time, device H serves as the tail node of the first forward path.

In the above two examples, device A is the head node of the first forward path, and the first network device may be device A. The second network device may be device C or device D.

In this example of the present disclosure, the first network device may send the second service message to the second network device according to its own message forwarding policy. For example, if it is applied in the SRv6 bearer network, the first network device may be a first service message encapsulating segment routing header (Segment Routing Header, SRH), and sends the second service message encapsulated with the SRH and the first in-situ flow detection option to the second network device, and the second network device can forward the second service message along the first forward path based on SRH until this service message is forwarded to the tail node of the first forward path.

The first in-situ flow detection option includes the above-mentioned in-situ flow detection data. In addition, first indication information and first additional information are additionally added. The value of the first indication information can be a first value or a second value, for example, the first value can be 1 and the second value can be 0.

When the first indication information has a value of a first value, the first in-situ flow detection option includes the first additional information.

When the first indication information has a value of a second value, the first in-situ flow detection option does not include the first additional information.

The first reverse service flow characteristics in the first additional information are characteristics of a reverse service flow that need to perform in-situ flow detection, and the reverse service flow is a service flow forwarded by the head node to the tail node on the first reverse path. The first reverse service flow characteristics may be the five-tuple information, or a source Internet Protocol (IP) address and a source port number, or a destination IP and a destination IP port number, etc. to reflect information of flow characteristics that need to perform in-situ flow detection. In an example, the first reverse service flow characteristics may further include other information for reflecting flow characteristics, such as a media access control (MAC) address carried in the message or the information for reflecting the flow characteristics in the load of the message.

It can be understood that, after receiving the second service message, the head node of the first reverse path can generate a first service flow identification rule based on first reverse service flow characteristics included in the first additional information, and the subsequent tail node of the first reverse path can identify a reverse service flow that needs to perform in-situ flow detection based on the first service flow identification rule.

With this method, after receiving the first service message, the first network device can send the second service message to the second network device, the second service message includes a first in-situ flow detection option and a first service message. Since the first in-situ flow detection option includes first indication information and first additional information, so when the tail node of the first forward path receives the second service message, it can obtain the first reverse service flow characteristics included in the first additional information. In this way, the tail node of the currently used path can automatically obtain the first reverse service flow characteristics. Since the reverse service flow does not pass through other backup paths, there is no need to manually configure the first reverse service flow characteristics for other backup paths, which can reduce the configuration workload.

In one implementation, the first in-situ flow detection option further includes second indication information, wherein the second indication information is to indicate whether the head node of the first reverse path generates the first service flow identification rule.

The second indication information may have a value of the first value or the second value, for example, the first value may be 1, and the second value may be 0.

When the second indication information has a value of the first value, it indicates that the head node generates the first service flow identification rule.

When the second indication information has a value of the second value, it indicates that the head node does not generate the first service flow identification rule.

In the example of the present disclosure, the first network device is pre-configured with first forward flow characteristics and second forward flow characteristics. Wherein, the first forward flow characteristics are characteristics of the forward service flow for in-situ flow detection, and the second forward flow characteristics are characteristics of the forward service flow corresponding to the reverse service flow for in-situ flow detection. That is, if the received message matches the first forward flow characteristics, the message needs to perform in-situ flow detection, and if the message also matches the second forward flow characteristics, it can be determined that the reverse service flow also needs to perform in-situ flow detection.

The first forward flow characteristics and the second forward flow characteristics may be the same. Alternatively, the second forward flow characteristics are obtained by further adding other characteristics based on the first forward flow characteristics. That is, all or part of the service flows in the service flows satisfying the first forward flow characteristics are service flows satisfying the second forward flow characteristics.

The above-mentioned first forward flow characteristics and second forward flow characteristics may be the five-tuple information, or information for reflecting flow characteristics that need to perform in-situ detection such as a destination IP and a destination IP port number, or source IP address and a source port number. In an example, the first forward service flow characteristics and the second forward service flow characteristics may further include other information for reflecting flow characteristics, such as a MAC address carried in the message or the information for reflecting the flow characteristics in the load of the message.

On this basis, after receiving the first service message, the first network device may match the first service message with the first forward flow characteristics and the second forward flow characteristics.

It should be noted that, the first forward flow characteristics and the second forward flow characteristics configured in the first network device may include multiple groups. After receiving the first service message, the head node may match the first service message with each group of first forward flow characteristics and each group of second forward flow characteristics respectively. The examples of the present disclosure take the matching process with a group of first forward flow characteristics and a group of second forward flow characteristics as an example for description.

After completing the above matching process, the first network device may encapsulate the in-situ flow detection option for the service message according to the matching result, which may specifically include the following three cases:

case 1: if the first service message matches the first forward flow characteristics and the second forward flow characteristics, the first in-situ flow detection option is encapsulated in the outer layer of the first service message to obtain a second service message.

In order to transmit the first service message in an SRv6 network, it is also necessary to encapsulate SRH in the outer layer of the first service message, that is, the second service message includes the first service message, the first in-situ flow detection option and the SRH.

The values of the first indication information and the second indication information included in the first in-situ flow detection option are both the first values, and the first in-situ flow detection option includes first reverse service flow characteristics.

In an example, the first network device may be configured with multiple groups of first reverse service flow characteristics corresponding to the second forward flow characteristics, and correspondingly, the first in-situ flow detection option may include multiple first additional Information. For example, if in-situ flow detection needs to be performed on the reverse flow of source IP address 1 and source port 1, and in-situ flow detection needs to be performed on the reverse flow of destination IP address 2 and destination port 2, then one group of the first reverse service flow characteristics include source IP address 1 and source port 1, and another group of first reverse service flow characteristics includes destination IP address 2 and destination port 2. Then, the first in-situ flow detection option includes two first additional information, and each first additional information includes a group of first reverse service flow characteristics.

In an example, after matching the first service message with the first forward flow characteristics and the second forward flow characteristics, it may include case 2 and case 3.

Case 2: if the first service message matches the first forward flow characteristics and does not match the second forward flow characteristics, the second in-situ flow detection option is encapsulated in the outer layer of the first service message to obtain a third service message which is sent to the second network device.

Wherein, the second in-situ flow detection option includes the first indication information and the second indication information whose values are both second values.

If the first service message matches the first forward flow characteristics, it indicates that the first service message needs to perform the in-situ flow detection, and therefore the first service message needs to be encapsulated with a second in-situ flow detection option.

In addition, because the first service message does not match the second forward flow characteristics, it is not necessary to perform in-situ flow detection on the reverse service flow corresponding to the first service message, that is, the tail node of the first forward path does not need to generate a first service flow identification rule, so the first network device can set the second indication information to a second value in the second in-situ flow detection option, which indicates that the tail node of the first forward path does not need to generate the first service flow identification rule.

In order to transmit the first service message in the SRv6 network, it is also necessary to encapsulate the SRH in the outer layer of the first service message, that is, the third service message includes the first service message, the second in-situ flow detection option and the SRH.

Case 3, if the first service message matches both the first forward flow characteristics and the second forward flow characteristics, and the first network device is not configured with the first reverse service flow characteristics, the first service message is encapsulated with the third in-situ flow detection option to obtain a fourth service message which is sent to the second network device.

Wherein, the third in-situ flow detection option includes first indication information whose value is the second value and the second indication information whose value is a first value.

If the first service message matches both the first forward flow characteristics and the second forward flow characteristics, it indicates that both the in-situ flow detection on the first service message is required, and the in-situ flow detection on the reverse service flow corresponding to the first service message is also required, then it is necessary to notify the tail node of the first forward path to generate the first service flow identification rule, so the second indication information can be set to the first value in the third in-situ flow detection option.

Because the first network device is not configured with the first reverse service flow characteristics, the first reverse service flow characteristics cannot be encapsulated in the third in-situ flow detection option, so the first indication information can be set to the second value in the third in-situ flow detection option, which indicates that the third in-situ flow detection option of the tail node does not include the first additional information, and then the tail node can automatically generate the first service flow identification rule based on a quintuple of the first service message. There is no need to manually configure the reverse service flow characteristics for this tail node, and there is no need to manually configure the reverse flow characteristics for the tail node of other backup paths, which can reduce the configuration workload. In addition, the hardware resources of the tail node of other backup paths will not be occupied, which can reduce the occupation of hardware resources in the bearer network.

In some cases, the source IP address and source port of the forward service flow are the destination IP address and destination port of the reverse service flow, and the destination IP address and destination port of the forward service flow are the source IP address and source port of the reverse service flow, so the tail node of the first forward path can generate the reverse service flow characteristics based on the quintuple of the forward service flow.

However, due to the asymmetry between the forward service flow characteristics and reverse service flow characteristics of some service flows, that is, the source port of the forward service flow is different from the destination port of the reverse service flow, or the source IP address of the forward service flow is different from the destination IP address of the reverse service flow. In this case, the tail node cannot directly generate the reverse service flow characteristics according to the quintuple of the forward service flow, so in this example of the present disclosure, the first reverse service flow characteristics may be configured in the first network device in advance, and the first network device may carry the first reverse service flow characteristics in the first additional information of the first in-situ flow detection option. Furthermore, the tail node may generate the first service flow identification rule based on the first reverse service flow characteristics carried in the first additional information. In this way, even if the quintuple of the reverse service flow is asymmetrical with the quintuple of the forward service flow, the tail node can accurately generate the first service flow identification rule, which ensures the accuracy of the first service flow identification rule generated by the tail node on the basis of reducing the configuration workload.

Wherein the first in-situ flow detection option, the second in-situ flow detection option, and the third in-situ flow detection option have the same structure, and they all include an extended flow detection type field, a service flow direction identification field, and a reserved field. One bit in the extended flow detection type field carries the first indication information, and the service flow direction identification field carries the second indication information. Wherein, in any one in-situ flow detection option, when the first indication information has a value of the first value, it is used to indicate that the in-situ flow detection option includes the first additional information, and when the first indication information has a value of the second value, it is used to indicate that the in-situ flow option does not include the first additional information. In addition, in any one in-situ flow detection option, when the second indication information has a value of the first value, it indicates that the head node of the reverse path generates the service flow identification rule, and when the second indication information has a value of the second value, it indicates that the head node of the reverse path does not generate the service flow identification rule.

Figure 4:
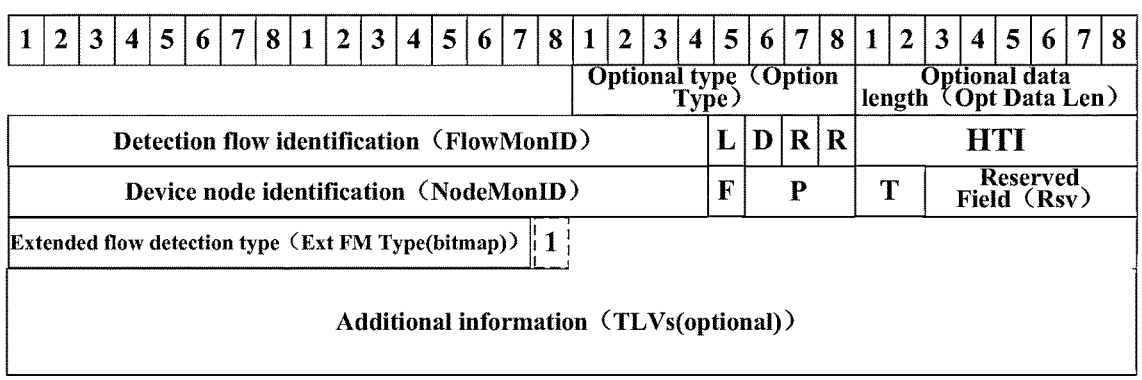
FIG. 4 is a schematic structural diagram of an in-situ flow detection option according to an example of the present disclosure.

The in-situ flow detection option can be encapsulated in a Destination Options header of an Internet Protocol Version 6 (IPv6) message, the structure of the in-situ flow detection option is shown in FIG. 4.

Wherein, the option type is the type of the in-situ flow detection option.

The option data length (Opt Data Len) is the length of the in-situ flow detection option.

FlowMonID, occupying 20 bits, is the ID of the detected service flow.

L, occupying 1 bit, is a packet loss (Loss) mark.

D, occupying 1 bit, is a delay mark.

R, Rsv, and Reserved are reserved fields.

The Header Type Indication (HTI) is used for indicating the carried extended data type.

When it takes the value of 0, it indicates that there is no extended data, and when it takes the value of non-zero, it indicates that the extended data is carried.

NodeMonID, occupying 20 bits, is a device node identification. The head node can add its own node identification in this field when encapsulating the in-situ flow detection option for the service message.

F, occupying 1 bit, is a service flow direction identification field, which is used to carry the second indication information. When it takes the value of 1, it indicates that the head node of the first reverse path generates the first service flow identification rule. When it takes the value of 0, it indicates that the head node of the first reverse path does not generate the first service flow identification rule.

P, is a measurement period.

T, occupying 1 bit, is used for indicating a detection type, and the detection type includes end-to-end detection and hop-by-hop detection.

The extension flow monitor type (Ext FM Type) field can be identified in the form of a bitmap. In this example of the present disclosure, a bit reserved by the Ext FM Type may be used to carry the first indication information, which is used to indicate whether the in-situ flow detection option carries the first additional information including the first reverse service flow characteristics, for example, the 13th reserved bit may be occupied to carry the first indication information. If the value of this bit is 1, it indicates that the first additional information including the first reverse service flow characteristics is carried; if the value of this bit is 0, it indicates that the first additional information including the first reverse service flow characteristics is not carried.

Taking FIG. 4 as an example of the first in-situ flow detection option, the reserved field after the extended flow detection type field may carry the first additional information. Wherein, the reserved field includes a Type-Length-Value (TLV) structure, and a Value field of the TLV structure carries the first additional information. Wherein, if the in-situ flow detection option includes multiple first additional information, the in-situ flow detection option includes multiple TLV structures, and each TLV structure carries one first additional information.

Figure 5A:
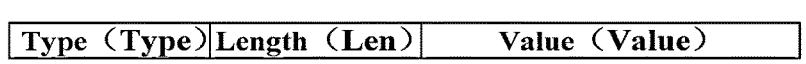
FIG. 5a is a schematic structural diagram of additional information according to an example of the present disclosure.

The additional information involved in the examples of the present disclosure are all TLV structures, as shown in FIG. 5*a*, wherein Type is the type of additional data. For example, if Type=1, it indicates that the additional data is the first reverse service flow characteristics.

Length represents the length of the additional data, and Value is the detailed content of the additional data, that is, the first reverse service flow characteristics.

Figure 5B:
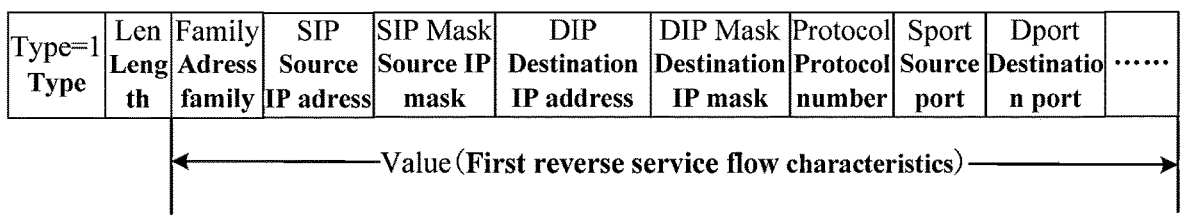
FIG. 5b is a schematic structural diagram of additional information according to an example of the present disclosure.

As an example, as shown in FIG. 5*b*, the first reverse service flow characteristics included in the Value part may be family, source IP address (SIP), source IP mask (SIP Mask), destination IP address (DIP), destination IP mask (DIP Mask), protocol number (Protocol), source port (Sport) and destination port (Dport). It may also include other information used for representing the first reverse service flow characteristics, which is not limited in this example of the present disclosure. Wherein, family is used for indicating the type of the IP address included in the first reverse service flow characteristics, for example, the type of the IP address may be an IPv6 address or an IPV4 address.

In addition, if it is necessary to perform in-situ flow detection on the reverse service flow of a same IP subnet, if the tail node of the first forward path generates the first service flow identification rule for each IP address in the network segment, it will consume a lot of hardware resources of the tail node. For example, if the IP subnet that needs to perform in-situ flow detection includes 100 IP addresses, the tail node needs to create one first service flow identification rule after receiving the service message of each IP address in the 100 IP addresses, therefore, 100 rules need to be created and sent to a hardware data forwarding plane, which will occupy a lot of hardware resources.

In this example of the present disclosure, the first reverse service flow characteristics configured in the first network device include an IP address and a mask used to indicate an IP subnet, and the head node used to indicate the first reverse path performs in-situ flow detection on the reverse service flow belonging to the IP subnet. In this way, in the case where the first network device determines that it is necessary to perform in-situ flow detection on the reverse service flow belonging to the same IP subnet, the first reverse service flow characteristics added in the first in-situ flow detection option includes the IP address and mask indicating the IP subnet. Furthermore, the head node of the first reverse path can generate a first service flow identification rule for the IP subnet and mask, so as to implement the in-situ flow detection on the reverse flow belonging to the IP subnet, which can reduce the occupancy for hardware resources.

Figure 6:
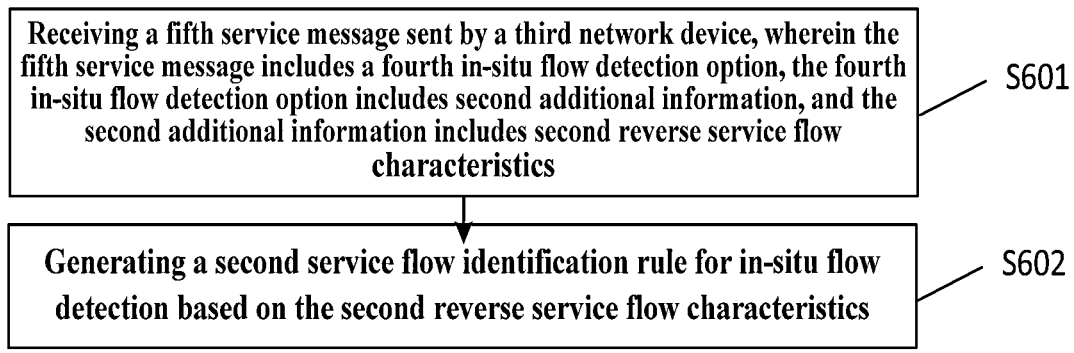
FIG. 6 is a flowchart of another message processing method according to an example of the present disclosure.

In the above example, the first network device is the head node of the first forward path. In addition, the first network device can also be used as the tail node of other forward paths. In this scenario, as shown in FIG. 6, the method includes:

S601, receiving a fifth service message sent by a third network device, wherein the fifth service message includes a fourth in-situ flow detection option, the fourth in-situ flow detection option includes second additional information, and the second additional information includes second reverse service flow characteristics.

The first network device and the third network device are both on the second forward path and the second reverse path, and the first network device is the head node of the second reverse path.

Wherein, the service flow forwarding direction in the second forward path is the direction from the third network device to the first network device, and the service flow forwarding direction in the second reverse path is the direction from the first network device to the third network device, the first network device is the tail node of the second forward path.

For example, if the second forward path is device 1-device 2-device 3-device A, and the second reverse path is device A-device 3-device 2-device 1, then device A is the first network device, and device A is both the tail node of the second forward path and the head node of the second reverse path.

S602, generating a second service flow identification rule for in-situ flow detection based on the second reverse service flow characteristics.

Wherein, the second service flow identification rule generated by the first network device as the head node of the second reverse path may be: performing in-situ flow detection on the service message matching the second reverse service flow characteristics.

By using this method, when the first network device acts as the head node of the second reverse path, the received fifth service message includes the fourth in-situ flow detection option, and the first network device can obtain the second reverse service flow characteristics from the second additional information of the fourth in-situ flow detection option, and generate the second service flow identification rule based on the second reverse service flow characteristics. In this way, even in the case that there are multiple backup paths, the tail node of the currently used backup path can automatically generate the second service flow identification rule. There is no need to manually configure the second reverse service flow characteristics for this tail node, and there is no need to manually configure the second reverse flow characteristics for other unused backup paths, which can reduce the configuration workload.

In addition, because the first network device can directly generate the second service flow identification rule based on the second reverse service flow characteristics in the fourth in-situ flow detection option of the fifth service message, instead of based on the quintile of the fifth service message, in the case that the fifth service message is asymmetric with the quintuple of the backhaul message, the first network device can also correctly generate the second service flow identification rule.

In the above S602, after generating the second service flow identification rule for in-situ flow detection based on the second reverse service flow characteristics, the first network device may store the second service flow identification rule in the forwarding plane. Further, when receiving the sixth service message that complies with the second service flow identification rule, the sixth service message is encapsulated with the fifth in-situ flow detection option, and the sixth service message encapsulated with the fifth in-situ flow detection option is sent to the third network device.

Wherein, the fifth in-situ flow detection option includes the first indication information and the second indication information which both take the values of the second value. The second indication information taking the value of the second value is used for indicating that the tail node of the second reverse path does not need to generate the reverse service flow identification rule, and the first indication information taking the value of the second value is used for indicating that the fifth in-situ flow detection option does not include additional information. The structure of the fifth in-situ flow detection option may refer to FIG. 4, the second indication information may be the value of the F field in FIG. 4, and the value of the second indication information may be 0; the first indication information may be one bit in an Ext FM Type field in FIG. 4, the value of the first indication information is 0.

Wherein, the sixth service message that complies with the second service flow identification rule refers to the service message received from a CE device when the first network device acts as the tail node of the second forward path and the head node of the second reverse path.

In this example of the present disclosure, after receiving the fifth service message sent by the third network device as the tail node of the second forward path, the first network device can parse the fourth in-situ flow option in the fifth service message, and perform subsequent operations based on the parsing results. The specific parsing process is as follows:

block1, parsing the F field of the fourth in-situ flow detection option, wherein the F field carries the second indication information.

performing block2 if the value of the second indication information is the first value; performing block4 if the value of the second indication information is the second value.

Block2, parsing the first indication information carried by the Ext FM Type of the fourth in-situ flow detection option.

Performing block3 if the first indication information is the first value; performing block5 if the first indication information is the second value.

Block3, obtaining the second additional information included in the fourth in-situ flow detection option, generating a second service flow identification rule based on the second reverse service flow characteristics included in the second additional information, and storing the second service flow identification rule in the forwarding plane, and performing block5.

Block4, generate a service flow identification rule based on the quintuple information of the fifth service message, storing the generated service flow identification rule in the forwarding plane, and performing block4.

Wherein, the first network device may use the source IP address and source port number included in the quintuple information as the destination IP address and destination port number of the reverse identification rule, respectively; use the destination IP address and destination port number included in the quintuple information as the source IP address and source port number of the reverse identification rule, respectively; use the protocol number included in the quintuple information as the protocol number of the reverse identification rule.

Block5, deleting the fourth in-situ flow detection option of the fifth service message, and forwarding the fifth service message without the fourth in-situ flow detection option to the CE device.

Wherein, the tail node also needs to delete an SRH extension header carried in the fifth service message, and then forward the fifth service message that was originally not encapsulated with the SRH header.

In order to further avoid excessive occupation of the hardware resources of the tail node, after the first network device stores the second service flow identification rule in the forwarding plane, if no message matching the second service flow identification rule is received within a specified time period, the second service flow identification rule is deleted from the forwarding plane.

When the first network device does not receive a message matching the second service flow identification rule for a long time due to reasons such as switching of the primary and backup paths, the second service flow identification rule can be aged out and deleted, so as to release the hardware resources of the tail node occupied by the second service flow identification rule and avoid the waste of hardware resources.

The message processing method provided by the example of the present disclosure is exemplarily described below with reference to FIG. 1. In FIG. 1, the device A is a head node. When the device A receives the first service message from the CE device outside the bearer network, it can parse characteristics of the first service message to determine whether the first service message matches the first forward flow characteristics and whether the first service message matches the second forward flow characteristics. If the first service message matches both the first forward flow characteristics and the second forward flow characteristics, it is determined that the in-situ flow detection needs to be performed on the first service message, and needs to be performed on a backhaul message of the first service message.

Then, the device A sequentially adds the first in-situ flow detection option and the SRH after the IPv6 header of the first service message to obtain the second service message, and then forwards the second service message to device C. Wherein, the structure of the first in-situ flow detection option can refer to FIG. 4, in which an F flag bit and a specified bit of Ext FM Type are both 1, and the first additional information carries first reverse service flow characteristics pre-configured in the device A.

In addition, the device A also needs to report measurement data to the analyzer according to a pre-configured detection period for the first forward flow characteristics, and the measurement data may include number of service messages that conforms to the first forward flow characteristics received within one detection period and timestamp when each service message is received. The examples of the present disclosure do not limit the detection period and the specific content included in the measurement data.

After receiving the second service message, the device C can forward the second service message to device E according to the path, and the device E forwards the second service message to device G. Wherein, the device C, the device E, and the device G can all report the measurement data to the analyzer according to the first in-situ flow detection option of the second service message.

After receiving the second service message, the device G as the tail node parses the first in-situ flow detection option included in the second service message, and can parse that the F flag bit is 1, and the specified bit in Ext FM Type is 1, then continues to parse the first additional information, obtains the first reverse service flow characteristics from the first additional information, generates a first service flow identification rule according to the first reverse service flow characteristics, and then stores the first service flow identification rule in the forwarding plane.

In addition, device G can delete the SRH and the first in-situ flow detection option of the encapsulated second service message, restore the original service message, and send the original service message to the device B according to a local forwarding table.

Subsequently, when the device G receives a service message from the device B, if the SRH of the service message matches the first service flow identification rule, it encapsulates the SRH and the in-situ flow detection option in the service message, the F flag bit included in the in-situ flow detection option is 0, and the specified bit in the Ext FM Type is 0.

Then, the service message is forwarded to the device A through the device E and the device C in sequence.

Figure 7:
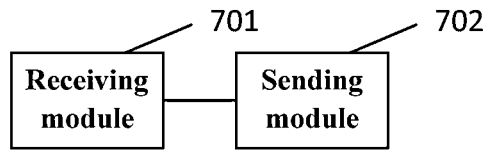
FIG. 7 is a structural diagram of a message processing apparatus according to an example of the present disclosure.

Corresponding to the foregoing method examples, the examples of the present disclosure further provide a message processing apparatus, which is applied to a first network device. As shown in FIG. 7, the apparatus includes:

a receiving module 701, to receive a first service message;

a sending module 702, to send a second service message to a second network device, wherein the second service message includes a first in-situ flow detection option and a first service message, the first in-situ flow detection option includes first additional information, and the first additional information includes first reverse service flow characteristics, and the first reverse service flow characteristics are used by the head node of a first reverse path for generating the first service flow identification rule for in-situ flow detection; wherein the head node is the tail node of the first forward path, and the first network device and the second network device are both on the first forward path and the first reverse path.

In another example of the present disclosure, the first in-situ flow detection option further includes first indication information, the first indication information is used for indicating whether the first in-situ flow detection option includes the first additional information; when the first indication information has a value of the first value, the first in-situ flow detection option includes the first additional information; when the first indication information has a value of the second value, the first in-situ flow detection option does not include the first additional information.

In another example of the present disclosure, the first in-situ flow detection option further includes second indication information, where the second indication information is used for indicating whether the head node generates the first service flow identification rule;

When the second indication information has a value of the first value, it indicates that the head node generates the first service flow identification rule; when the second instruction information has a value of the second value, it indicates that the head node does not generate the first service flow identification rule.

In another example of the present disclosure, the apparatus further includes:

a matching module, to match the first service message with the first forward flow characteristics and the second forward flow characteristics, where the first forward flow characteristics are the characteristics of the forward service flow for in-situ flow detection, and the second forward flow characteristics are the characteristics of the forward service flow corresponding to the reverse service flow for in-situ flow detection;

an encapsulation module, to encapsulate the first in-situ flow detection option in the outer layer of the first service message if the first service message matches both the first forward flow characteristics and the second forward flow characteristics to obtain the second service message.

In another example of the present disclosure, the encapsulation module is further to:

encapsulate, if the first service message matches the first forward flow characteristics and does not match the second forward flow characteristics, the second in-situ flow detection option in the outer layer of the first service message to obtain a third service message, and send the third service message to the second network device; the second in-situ flow detection option includes first indication information and second indication information whose values are both second values; or, encapsulate, if the first service message matches both the first forward flow characteristics and the second forward flow characteristics and the first network device is not configured with the first reverse service flow characteristics, the first service message with a third in-situ flow detection option to obtain a fourth service message, and send the fourth service message to the second network device; the third in-situ flow detection option includes the first indication information whose value is the second value and the second indication information whose value is a first value.

In another example of the present disclosure, the first reverse service flow characteristics include an IP address and a mask for representing an IP subnet, which are used to indicate the head node to perform in-situ flow detection on the reverse service flow belonging to the IP subnet.

In another example of the present disclosure, the first in-situ flow detection option, the second in-situ flow detection option, and the third in-situ flow detection option all include an extended flow detection type field, a service flow direction identification field, and a reserved field. One bit in the extended flow detection type field carries the first indication information, and the service flow direction identification field carries the second indication information.

In another example of the present disclosure, the reserved field of the first in-situ flow detection option carries the first additional information.

In another example of the present disclosure, the reserved field of the first in-situ flow detection option includes a TLV structure, and a value field of the TLV structure carries the first additional information.

In another example of the present disclosure, the apparatus further includes: a generating module;

a receiving module 701, to receive a fifth service message sent by a third network device, where the fifth service message includes a fourth in-situ flow detection option, the fourth in-situ flow detection option includes second additional information, and the second additional information includes the second reverse service flow characteristics, the first network device and the third network device are both on the second forward path and the second reverse path, and the first network device is the head node of the second reverse path;

a generating module, to generate a second service flow identification rule for in-situ flow detection based on the second reverse service flow characteristics.

In another example of the present disclosure, the apparatus further includes:

a storage module, to store the second service flow identification rule in the forwarding plane;

an encapsulation module, further to encapsulate, when receiving a sixth service message that conforms to the second service flow identification rule, the sixth service message with a fifth in-situ flow detection option, and send the sixth service message encapsulated with the fifth in-situ flow detection option to the third network device, the fifth in-situ flow detection option includes first indication information and second indication information whose values are both second values.

In another example of the present disclosure, the apparatus further includes:

a deleting module, to delete, if no service message matching the second service flow identification rule is received within a specified time period, the second service flow identification rule from the forwarding plane.

Figure 8:
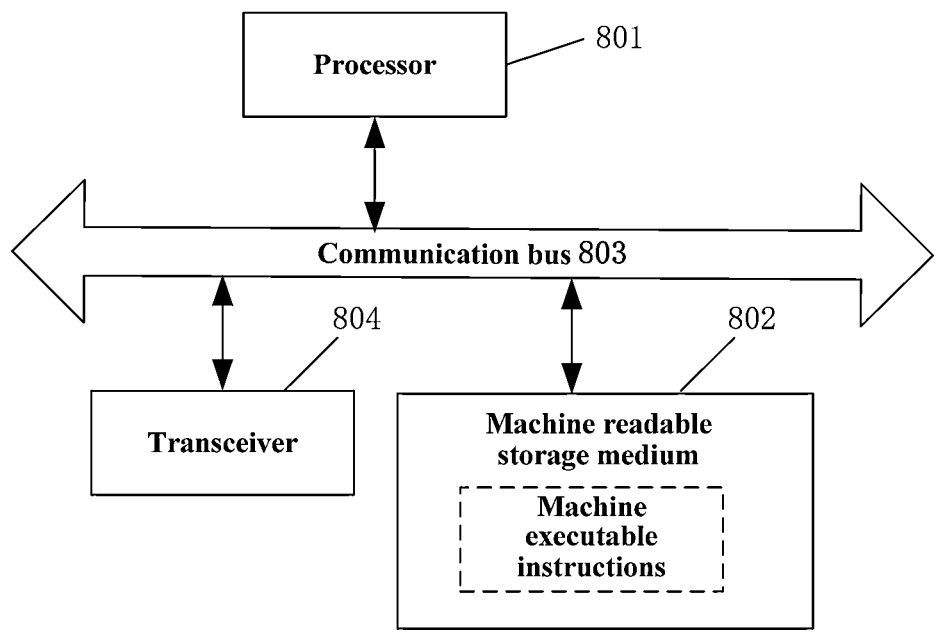
FIG. 8 is a structural diagram of a network device according to an example of the present disclosure.

Based on the same inventive concept, according to the message processing method provided by the above examples of the present disclosure, the examples of the present disclosure further provide a network device, as shown in FIG. 8, including a processor 801, a machine-readable storage medium 802 and a transceiver device 804. The machine-readable storage medium 802 stores machine-executable instructions executable by the processor 801; the machine-executable instructions cause the processor 801 to perform the following blocks:

receiving a first service message through a transceiver 804; sending a second service message to a second network device through the transceiver 804, wherein the second service message includes a first in-situ flow detection option and the first service message, wherein the first in-situ flow detection option includes first additional information, the first additional information includes first reverse service flow characteristics, and the first reverse service flow characteristics are used by a head node of a first reverse path for generating a first service flow identification rule for in-situ flow detection; wherein, the head node is a tail node of the first forward path, and the first network device and the second network device are both on the first forward path and the first reverse path.

In an example, the first in-situ flow detection option further includes first indication information, which is used to indicate whether the first in-situ flow detection option includes the first additional information;

when the first indication information has a value of a first value, the first in-situ flow detection option includes the first additional information;

when the first indication information has a value of a second value, the first in-situ flow detection option does not include the first additional information.

In an example, the first in-situ flow detection option further includes second indication information, the second indication information is used to indicate whether the head node generates the first service flow identification rule;

when the second indication information has a value of the first value, it indicates that the head node generates the first service flow identification rule;

when the second indication information has a value of the second value, it indicates that the head node does not generate the first service flow identification rule.

In an example, the machine-executable instructions further cause the processor 801 to perform the following blocks:

matching the first service message with the first forward flow characteristics and the second forward flow characteristics, the first forward flow characteristics are characteristics of the forward service flow for in-situ flow detection, and the second forward flow characteristics are characteristics of the forward service flow corresponding to the reverse service flow for in-situ flow detection;

encapsulating, if the first service message matches the first forward flow characteristics and the second forward flow characteristics, the first service message with the first in-situ flow detection option in the outer layer of the first service message to obtain the second service message.

In an example, the machine-executable instructions further cause the processor 801 to perform the following blocks:

encapsulating, if the first service message matches the first forward flow characteristics and does not match the second forward flow characteristics, the first service message with the second in-situ flow detection option in the outer layer of the first service message to obtain a third service message, and sending the third service message to the second network device through the transceiver; the second in-situ flow detection option includes first indication information and second indication information whose values are both second values; or, encapsulating, if the first service message matches both the first forward flow characteristics and the second forward flow characteristics and the first network device is not configured with the first reverse service flow characteristics, the first service message with a third in-situ flow detection option to obtain a fourth service message, and sending the fourth service message to the second network device through the transceiver; the third in-situ flow detection option includes the first indication information whose value is the second value and the second indication information whose value is a first value.

In an example, the first reverse service flow characteristics include an IP address and a mask for representing an IP subnet, which is used to indicate the head node to perform in-situ flow detection on the reverse service belonging to the IP subnet.

In an example, the first in-situ flow detection option, the second in-situ flow detection option, and the third in-situ flow detection option all include an extended flow detection type field, a service flow direction identification field, and a reserved field, one bit in the extended flow detection type field carries the first indication information, and the service flow direction identification field carries the second indication information.

In an example, the reversed field of the first in-situ flow detection option carries the first additional information.

In an example, the reserved field of the first in-situ flow detection option includes a TLV structure, and a value field of the TLV structure carries the first additional information.

In an example, the machine-executable instructions further cause the processor 801 to perform the following blocks:

receiving a fifth service message sent by a third network device through the transceiver, the fifth service message includes a fourth in-situ detection option, and the fourth in-situ detection option includes second additional information, the second additional information includes second reverse service flow characteristics, the first network device and the third network device are both on the second forward path and the second reverse path, the first network device is the head node of the second reverse path;

and generating a second service flow identification rule for flow detection based on the second reverse service flow characteristics.

In an example, the machine executable instructions further cause the processor 801 to perform the following blocks: storing the second service flow identification rule to a forwarding plane; encapsulating, when receiving a sixth service message that conforms to the second service flow identification rule through the transceiver 804, the sixth service message with a fifth in-situ flow detection option, and sending the sixth service message encapsulated with the fifth in-situ detection option to the third network device through the transceiver 804, the fifth in-situ flow detection option includes first indication information and second indication information which both take the values of the second value.

In an example, the machine-executable instructions further cause the processor 801 to perform the following blocks:

deleting, if no service message matching the second service flow identification rule is received through the transceiver within a specified time period, the second service flow identification rule from the forwarding plane.

As shown in FIG. 8, the electronic device may also include a communication bus 803. The processor 801, the machine-readable storage medium 802, and the transceiver 804 communicate with each other through the communication bus 803. The communication bus 803 may be a Peripheral Component Interconnect (PCI) bus or an Extended Industry Standard Architecture (EISA) bus, etc. The communication bus 803 can include an address bus, a data bus, a control bus, or the like.

The transceiver 804 may be a wireless communication module, and under the control of the processor 801, the transceiver 804 performs data interaction with other devices (ACs and terminals).

The machine-readable storage medium 802 can include a random access memory (RAM), or can include a non-volatile memory (NVM), for example at least one disk memory. In addition, the machine-readable storage medium 802 can also be at least one storage device located away from the processor described above.

The aforementioned processor 801 can be a general-purpose processor, such as a central processing unit (CPU), a network processor (NP), or the like; it can also be a digital signal processor (DSP), an disclosure specific integrated circuit (ASIC), a field-programmable gate array (FPGA) or other programmable logic device, a discrete gate or transistor logic device, a discrete hardware component.

Based on the same inventive concept, according to the message processing method provided by the above examples of the present disclosure, the examples of the present disclosure further provide a machine-readable storage medium, which stores machine executable instructions that can be executed by the processor. The processor is caused by the machine executable instructions to implement blocks of any of the above message processing methods.

In yet another example provided by the present disclosure, a computer program product including instructions is also provided, which, when running on a computer, causes the computer to execute blocks of any of the above message processing methods in the foregoing examples.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

All the examples are described in corresponding ways, same or similar parts in each of the examples can be referred to one another, and the parts emphasized are differences to other examples. Particularly, the examples of the apparatus are described briefly, since they are similar to the examples of the method, and for similar parts, one could refer to the corresponding description of the examples of the method.

The description is only for preferred examples of the present disclosure, and examples are not so limited. Any modifications, substitutions, improvements, etc., which are made within the spirit and principles of the present disclosure, will fall into the protection scope of the present disclosure.

What is claimed is:

1. A message processing method, which is applied to a first network device, the method comprising:
   receiving a first service message;
   sending a second service message to a second network device, wherein the second service message includes a first in-situ flow detection option and the first service message, wherein the first in-situ flow detection option includes first additional information, the first additional information includes first reverse service flow characteristics, and the first reverse service flow characteristics are used by a head node of a first reverse path for generating a first service flow identification rule for in-situ flow detection, wherein the first reverse service flow characteristics include an IP address and a mask for representing an IP subnet, which are used to indicate the head node to perform in-situ flow detection on the reverse service flow belonging to the IP subnet; and
   wherein, the head node is a tail node of a first forward path, and the first network device and the second network device are both on the first forward path and the first reverse path.

2. The method of claim 1, wherein after receiving the first service message, the method further comprises:
   matching the first service message with the first forward flow characteristics and second forward flow characteristics, the first forward flow characteristics are characteristics of the forward service flow for in-situ flow detection, and the second forward flow characteristics are characteristics of the forward service flow corresponding to the reverse service flow for in-situ flow detection;
   encapsulating, if the first service message matches the first forward flow characteristics and the second forward flow characteristics, the first service message with the first in-situ flow detection option in the outer layer of the first service message to obtain the second service message.

3. The method of claim 2, further comprising:
   encapsulating, if the first service message matches the first forward flow characteristics and does not match the second forward flow characteristics, the first service message with a second in-situ flow detection option in the outer layer of the first service message to obtain a third service message, and sending the third service message to the second network device; the second in-situ flow detection option includes first indication information and second indication information whose values are both second values; or,
   encapsulating, if the first service message matches both the first forward flow characteristics and the second forward flow characteristics and the first network device is not configured with the first reverse service flow characteristics, the first service message with a third in-situ flow detection option to obtain a fourth service message, and sending the fourth service message to the second network device; the third in-situ flow detection option includes the first indication information whose value is the second value and the second indication information whose value is a first value.

4. The method of claim 3, wherein the first in-situ flow detection option, the second in-situ flow detection option, and the third in-situ flow detection option all include an extended flow detection type field, a service flow direction identification field, and a reserved field, one bit in the extended flow detection type field carries the first indication information, and the service flow direction identification field carries the second indication information.

5. The method of claim 4, wherein the reversed field of the first in-situ flow detection option carries the first additional information.

6. The method of claim 5, wherein the reversed field of the first in-situ flow detection option includes a TLV structure, and a value field of the TLV structure carries the first additional information.

7. The method of claim 1, further comprising:
   receiving a fifth service message sent by a third network device, the fifth service message includes a fourth in-situ detection option, and the fourth in-situ detection option includes second additional information, the second additional information includes second reverse service flow characteristics, the first network device and the third network device are both on the second forward path and the second reverse path, the first network device is the head node of the second reverse path; and
   generating a second service flow identification rule for in-situ flow detection based on the second reverse service flow characteristics.

8. The method of claim 7, wherein after generating the second service flow identification rule for in-situ flow detection based on the second reverse service flow characteristics, the method further comprises:
   storing the second service flow identification rule to a forwarding plane;

encapsulating, when receiving a sixth service message that conforms to the second service flow identification rule, the sixth service message with a fifth in-situ flow detection option, and sending the sixth service message encapsulated with the fifth in-situ flow detection option to the third network device, the fifth in-situ flow detection option includes first indication information and second indication information whose values are both second values.

9. The method of claim 8, wherein after storing the second service flow identification rule to the forwarding plane, the method further comprises:
deleting, if no service message matching the second service flow identification rule is received within a specified time period, the second service flow identification rule from the forwarding plane.

10. The method of claim 1, wherein, the first in-situ flow detection option further includes first indication information, the first indication information is used to indicate whether the first in-situ flow detection option includes the first additional information;
when the first indication information has a value of a first value, the first in-situ flow detection option includes the first additional information;
when the first indication information has a value of a second value, the first in-situ flow detection option does not include the first additional information.

11. The method of claim 10, wherein, the first in-situ flow detection option further includes second indication information, the second indication information is used to indicate whether the head node generates the first service flow identification rule;
when the second indication information has a value of the first value, it indicates that the head node generates the first service flow identification rule;
when the second indication information has a value of the second value, it indicates that the head node does not generate the first service flow identification rule.

12. A network device, comprising:
a processor,
a transceiver;
a machine-readable storage medium, which stores machine executable instructions that can be executed by the processor; the machine executable instructions cause the processor to perform the following operations:
receiving a first service message through the transceiver;
sending a second service message to a second network device through the transceiver, wherein the second service message includes a first in-situ flow detection option and the first service message, wherein the first in-situ flow detection option includes first additional information, the first additional information includes first reverse service flow characteristics, and the first reverse service flow characteristics are used by a head node of a first reverse path for generating a first service flow identification rule for in-situ flow detection, wherein the first reverse service flow characteristics include an IP address and a mask for representing an IP subnet, which are used to indicate the head node to perform in-situ flow detection on the reverse service belonging to the IP subnet; and
wherein the head node is a tail node of a first forward path, and the first network device and the second network device are both on the first forward path and the first reverse path.

13. The network device of claim 12, wherein the machine executable instructions also cause the processor to perform the following operations:
matching the first service message with the first forward flow characteristics and second forward flow characteristics, the first forward flow characteristics are characteristics of the forward service flow for in-situ flow detection, and the second forward flow characteristics are characteristics of the forward service flow corresponding to the reverse service flow for in-situ flow detection;
encapsulating, if the first service message matches the first forward flow characteristics and the second forward flow characteristics, the first service message with the first in-situ flow detection option in the outer layer of the first service message to obtain the second service message.

14. The network device of claim 13, wherein the machine executable instructions also cause the processor to perform the following blocks:
encapsulating, if the first service message matches the first forward flow characteristics and does not match the second forward flow characteristics, the first service message with a second in-situ flow detection option in the outer layer of the first service message to obtain a third service message, and sending the third service message to the second network device through the transceiver; the second in-situ flow detection option includes first indication information and second indication information whose values are both second values; or,
encapsulating, if the first service message matches both the first forward flow characteristics and the second forward flow characteristics and the first network device is not configured with the first reverse service flow characteristics, the first service message with a third in-situ flow detection option to obtain a fourth service message, and sending the fourth service message to the second network device through the transceiver; the third in-situ flow detection option includes the first indication information whose value is the second value and the second indication information whose value is a first value.

15. The network device of claim 14, wherein the first in-situ flow detection option, the second in-situ flow detection option, and the third in-situ flow detection option all include an extended flow detection type field, a service flow direction identification field, and a reserved field, one bit in the extended flow detection type field carries the first indication information, and the service flow direction identification field carries the second indication information.

16. The network device of claim 15, wherein the reversed field of the first in-situ flow detection option carries the first additional information.

17. The network device of claim 16, wherein the reversed field of the first in-situ flow detection option includes a TLV structure, and a value field of the TLV structure carries the first additional information.

18. The network device of claim 12, wherein the machine executable instructions also cause the processor to perform the following blocks:
receiving a fifth service message sent by a third network device through the transceiver, the fifth service message includes a fourth in-situ detection option, and the fourth in-situ detection option includes second additional information, the second additional information includes second reverse service flow characteristics, the first network device and the third network device are both on the second forward path and the second reverse path, the first network device is the head node of the second reverse path; and generating a second service flow identification rule for in-situ flow detection based on the second reverse service flow characteristics.

19. The network device of claim 16, wherein the machine executable instructions also cause the processor to perform the following operations:

storing the second service flow identification rule to a forwarding plane;

encapsulating, when receiving a sixth service message that conforms to the second service flow identification rule through the transceiver, the sixth service message with a fifth in-situ flow detection option, and sending the sixth service message encapsulated with the fifth in-situ flow detection option to the third network device through the transceiver, the fifth in-situ flow detection option includes first indication information and second indication information whose values are both second values.

20. The network device of claim 17, wherein the machine executable instructions also cause the processor to perform the following blocks:

deleting, if no service message matching the second service flow identification rule is received through the transceiver within a specified time period, the second service flow identification rule from the forwarding plane.

21. The network device of claim 12, wherein, the first in-situ flow detection option further includes first indication information, the first indication information is used to indicate whether the first in-situ flow detection option includes the first additional information;

when the first indication information has a value of a first value, the first in-situ flow detection option includes the first additional information;

when the first indication information has a value of a second value, the first in-situ flow detection option does not include the first additional information.

22. The network device of claim 19, wherein, the first in-situ flow detection option further includes second indication information, the second indication information is used to indicate whether the head node generates the first service flow identification rule;

when the second indication information has a value of the first value, it indicates that the head node generates the first service flow identification rule;

when the second indication information has a value of the second value, it indicates that the head node does not generate the first service flow identification rule.

* * * * *